United States Patent [19]

Dowd et al.

[11] 4,051,860

[45] Oct. 4, 1977

[54] VALVE CONTROL MECHANISM

[75] Inventors: Allyn C. Dowd, Sterling Heights; Habibur Rahman, Detroit, both of Mich.

[73] Assignee: Massey-Ferguson Inc., Detroit, Mich.

[21] Appl. No.: 640,809

[22] Filed: Dec. 15, 1975

[51] Int. Cl.[2] .......................... E02F 3/85; F16K 51/00

[52] U.S. Cl. .................................. 137/271; 137/636.2; 137/637

[58] Field of Search ............ 137/269, 271, 636, 636.2, 137/636.3, 636.4, 637, 351, 354; 251/143; 172/801-804; 74/523

[56] References Cited

U.S. PATENT DOCUMENTS

| | | | |
|---|---|---|---|
| 2,464,110 | 3/1949 | Wright | 137/269 X |
| 2,979,081 | 4/1961 | McCanse et al. | 137/636 |

*Primary Examiner*—Martin P. Schwadron
*Assistant Examiner*—Richard Gerard
*Attorney, Agent, or Firm*—Thomas P. Lewandowski

[57] ABSTRACT

A valve control mechanism for operating a plurality of valves in a bank of valves which can be selectively operated by interchangeable lever arrangements one of which has a separate lever for each valve and another of which has a single lever for a pair of valves. The bank of valves and the lever arrangements are detachably removable independently of each other to permit easy servicing and selecting of the desired lever arrangement or to change the sequence of valve operation.

9 Claims, 12 Drawing Figures

VALVE CONTROL MECHANISM

This invention relates to valve control arrangements for operating a plurality of valves and particularly to a valve console by which control levers of different types may be substituted for each other.

Many load and earth handling machines such as a backhoe mounted on a tractor use numerous hydraulic motors to separately control various elements such as a boom which is elevated and swings about a vertical axis, a dipper stick which is adjusted in angle relative to the boom and a digging bucket which is pivoted relative to the dipper stick. In addition, hydraulic motors are used to position stabilizers which are moved relative to the backhoe and into engagement with the ground to steady the backhoe. For these functions alone it is usual to use at least six separate valves which may be separately controlled by separate control levers or in which two related movements and therefore the two related valves may be controlled by a single lever control mechanism.

The possible relative arrangements and patterns of control levers for six separate valves varies between the manufacturuers of such equipment and even the same manufacturer may have different lever control patterns for similar equipment. With such equipment it often becomes desirable and necessary to modify or rearrange the control patterns to suit a particular arrangement or pattern to which the operator has become accustomed or to interchange single lever, dual valve controls and individual lever, single valve controls. Heretofore, a change of either lever control patterns or types of control levers has required substantial modification of the control console in which such levers are mounted by modifying linkage between the control levers and the valves or by rearranging the valves together with their integrally associated control levers. Such modifications become time consuming and expensive to achieve.

It is an object of the invention to provide a control console for a multiplicity of valves in which various lever controls may be readily interchanged with a minimum of time and effort.

Still another object of the invention is to provide a control console for a multiplicity of valves in which the control patterns of the various lever controls may be readily varied without requiring repositioning of the valves or modifying the control linkage between the valves and levers.

The valve control console or mechanism of the invention includes a bank of individually controllable valves which may be controlled by a selected lever assembly having either a separate lever for each valve or a single lever for a pair of valves, the lever assemblies being readily attachable to and detachable from a support structure in association with the valves to be operated. The lever assemblies are connectable to valves by elements easily detachable between the valves and a selected one of the lever assemblies. One of the lever assemblies has control levers for each of the valves arranged for movement about a common axis and the other of the lever assemblies has a single control lever to individually or simultaneously operate a pair of valves by movement of the single control lever about intersecting axes.

Figure 1:
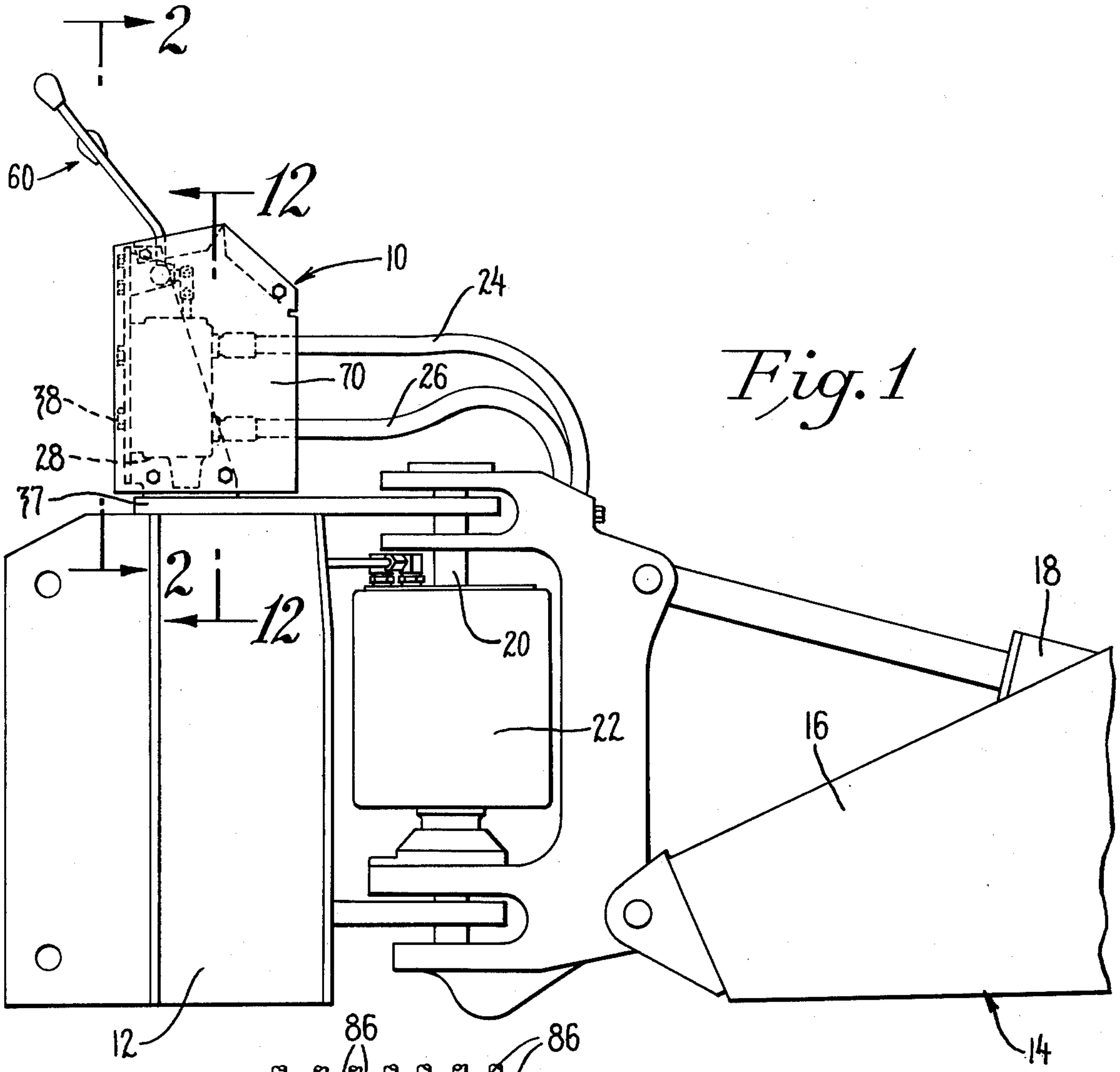
FIG. 1 is a side elevation of a portion of a backhoe incorporating the valve control mechanism embodying the present invention.

The control console embodying the invention is designated at 10 and as shown supported on a main frame member 12 in a position at an operators station of a backhoe 14 only a portion of which is shown but which includes a boom 16 which is vertically adjustable by means of a hydraulic actuator 18. The boom 16 is supported for swinging movement on a vertical post 20 by means of a rotary hydraulic actuator 22. Other hydraulic actuators are used to control the dip stick, bucket and a pair of stabilizers which are conventional and well known in the art and are not shown. Each of such actuators is connected by a pair of hydraulic lines 24 and 26 which serve to control delivery and return of fluid between the associated hydraulic actuator and control valve.

Figure 12:
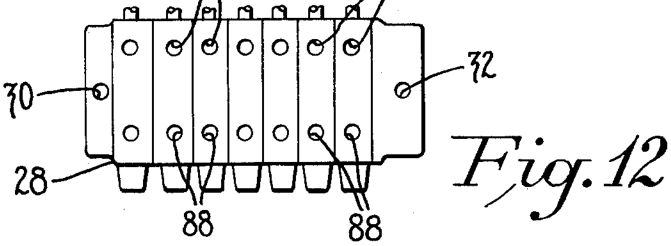
FIG. 12 is a sectional view taken on line 12—12 in FIG. 1.

The console 10 incorporates a valve manifold 28 which includes a plurality of valves arranged in a bank in side by side relationship and which receive hydraulic fluid from a conventional source of hydraulic pressure through a common delivery port 30 and return the fluid to the source through a return port 32 as seen in FIG. 12.

The manifold or bank of valves 28 is mounted on a support frame which includes a pair of side frame members 34 and 36 fastened by bolts to a base member 37 forming part of the main frame 12. The manifold is attached to the side frame member 34 and 36 by bolts 38.

Figure 2:
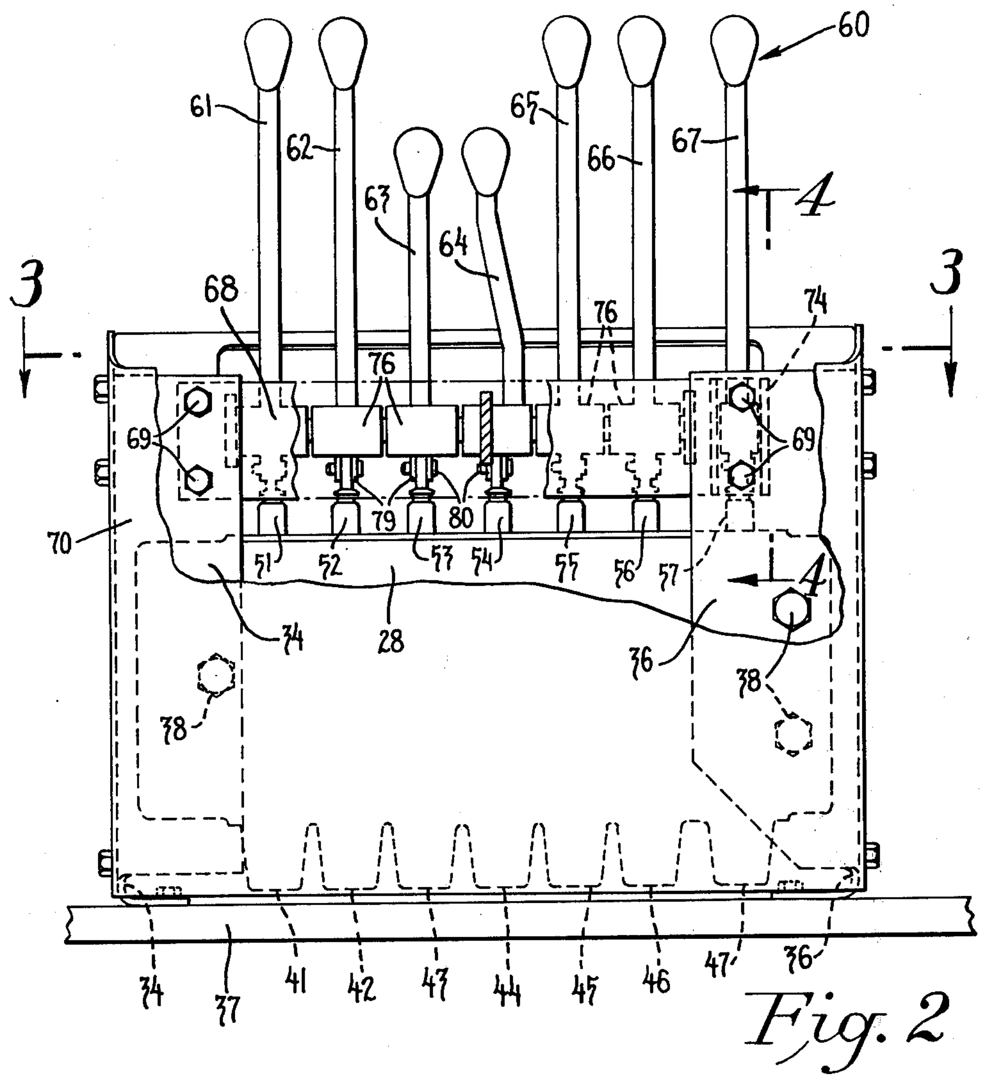
FIG. 2 is a sectional view at an enlarged scale taken in the direction of line 2—2 in FIG. 1.

As seen in FIG. 2 the manifold 28 includes a bank of valves which may be generally identical and which are indicated in their entirety by the reference characters 41 through 47. The valves are each provided with a vertically movable plunger 51 through 57, respectively, which are aligned in a common plane and are moved vertically in opposite directions from a neutral position to control the respective valves. By way of example the valve 41 can be used to control swinging of the boom, valve 42 to control the positioning of the left stabilizer, valve 44 to control the right stabilizer, valve 46 to control the angular position of the dipper stick and valve 46 to control the tipping of the bucket. Valve 47 can be employed to operate some other hydraulically controlled accessory such as a telescoping boom or dipper.

Figure 3:
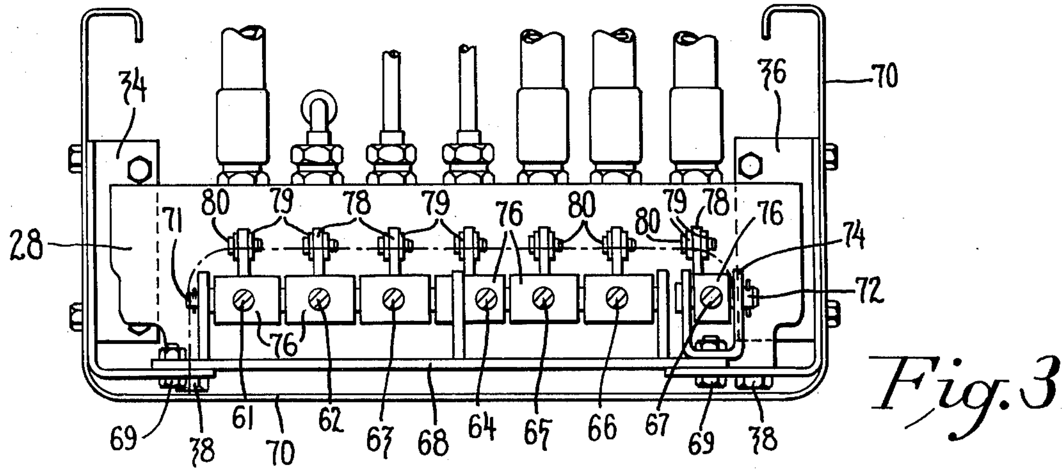
FIG. 3 is a sectional view taken on line 3—3 in FIG. 2.

Operation of the valves 41 through 47 is controlled by movement of the respective control plunger 51 through 57. As best seen in FIG. 2 the control plungers are moved by a lever assembly 60 including separate control levers 61 through 67 operatively connected to each of the control plungers 51 through 57. As seen in FIGS. 2 and 3 the levers 61 through 67 are mounted on a bracket 68 which is mounted in a generally horizontal position between the frame members 34 and 36 by means of bolts 69. The entire structure including the manifold 28 and frame members 34 and 36 are covered by a sheet metal housing indicated at 70 so that the control levers 61 through 67 project from an upper part of the console 10.

The bracket 68 supports a horizontal shaft 71 on which the levers 61 through 66 are mounted. The lever 67 is mounted on a separate shaft 72 supported by a U-shaped bracket 74 held in position relative to the bracket 68 by the bolts 69 so that the shaft 72 is axially aligned with the shaft 71.

Figure 4:
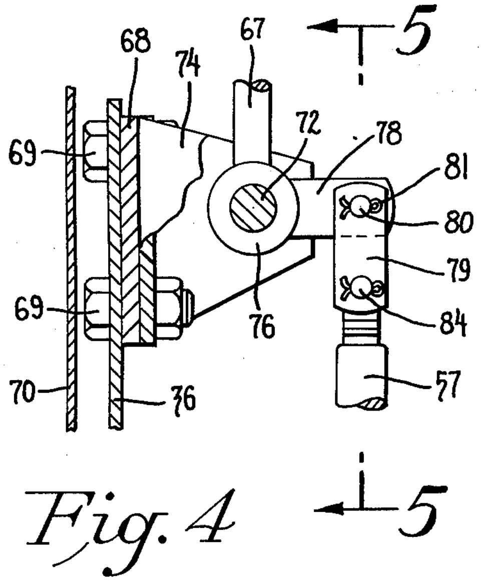
FIG. 4 is a sectional view at an enlarged scale taken on line 4—4 in FIG. 2.
Figure 5:
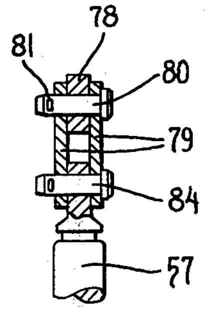
FIG. 5 is a sectional view taken on line 5—5 in FIG. 4.

Referring now to FIG. 4 the lower end of the lever 67 is provided with a collar 76 which is rotatably mounted on the shaft 72 between the legs of the U bracket 74. An arm 78 projects from the collar 76 and the outer end of the arm is pivotally connected to a pair of links 79 by a pivot pin 80 held in place by a cotter pin 81. The lower ends of the links 79 are pivotally connected by another pin 84 removably held in position by a cotter pin to the upper end of the control plunger 57.

The valve levers 61 through 66 are generally similar to the valve lever 67 in that each includes a collar 76 rotatably mounted on the shaft 70 and each includes an arm 78 connected to the respective control plungers 51 through 56 by means of links 79 and pins 80 and 84.

The lever arms 78 on the levers 61 through 67 are equally spaced apart as seem in FIG. 3 to conform to the equal spacing of the control plungers 51 through 57. Also, when the valves 41 through 47 are in their neutral position, the pins 80 in the free end of the lever arms 78 are axially aligned with each other.

In the arrangement just described each of the valves is provided with its own control lever for individual operation of each of the valves.

Referring now to FIG. 12 each of the valves is provided with a pair of ports 86 and 88 which are connected by a pair of lines 24 and 26 to a particular hydraulic actuator to be operated. If it is desired to change the operating pattern of the control levers 61 through 67 it simply is necessary to remove the pair of lines 24 and 26 for one of the hydraulic actuators from a valve and substitute another pair of lines from a different actuator. In the alternative, the detachable pins 84 may be removed from each of the control plunges 51 through 57 and the valves 41 through 47 in the manifold 28 may be rearranged to obtain the desired control pattern or sequence for the levers.

If, for example, the valve 41 is employed to swing the boom 16 and the valve 42 is used to elevate the boom, the function of the valves 41 and 42 can be reversed by removing the pair of lines 24 and 26 from the valve 41 and connecting them to the valve 42 and to connect the removed lines to the valve 41. Alternatively, the position of the valves 41 and 42 may be reversed in the manifold 28.

If it is desired to change the individual separate lever controls 61 through 67 for other types of levers it is simply necessary to remove the pins 80 from the ends of the arms 78 after which removal of the bolts 69 makes it possible to remove the levers 61 through 66 with the bracket 68 and the control lever 67 with the U-shaped bracket 74 in readiness for attachment of a different control lever arrangement.

Figure 6:
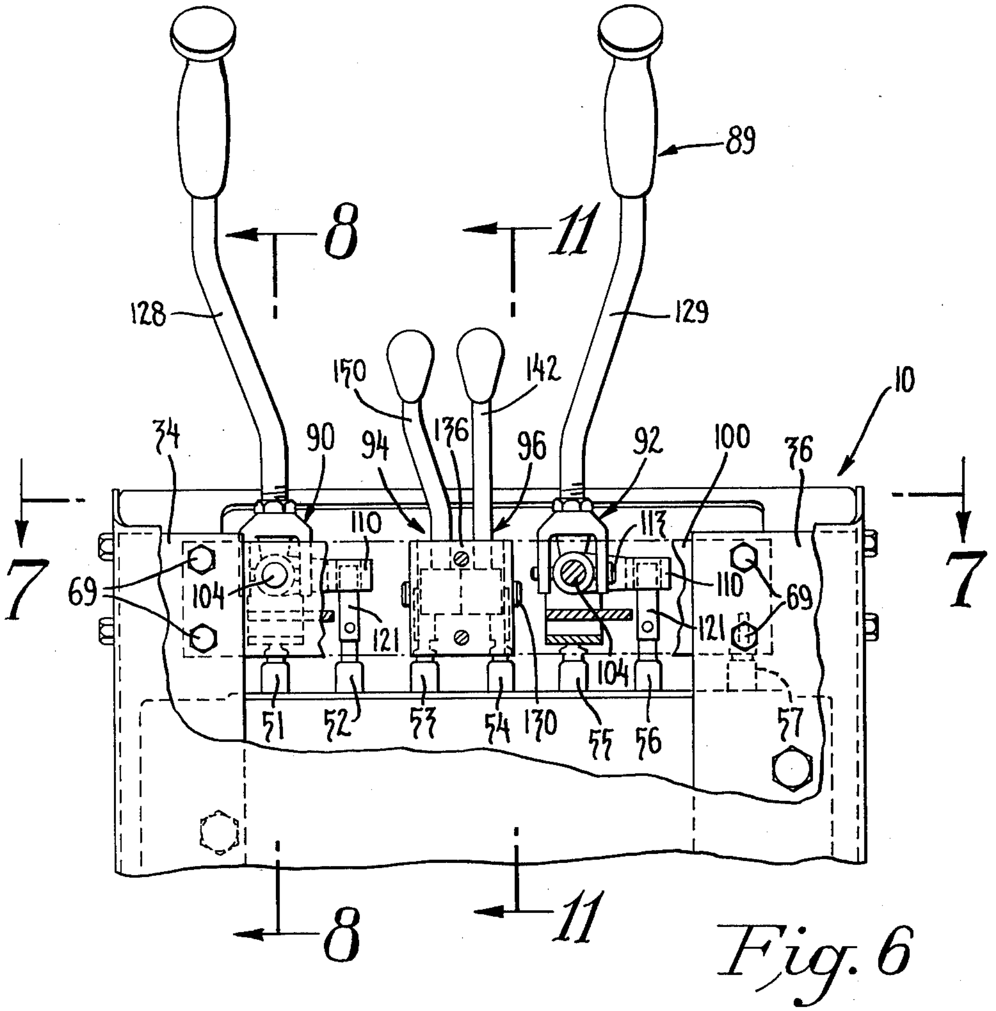
FIG. 6 is a view similar to FIG. 2 but showing a different form of lever control arrangement.
Figure 7:
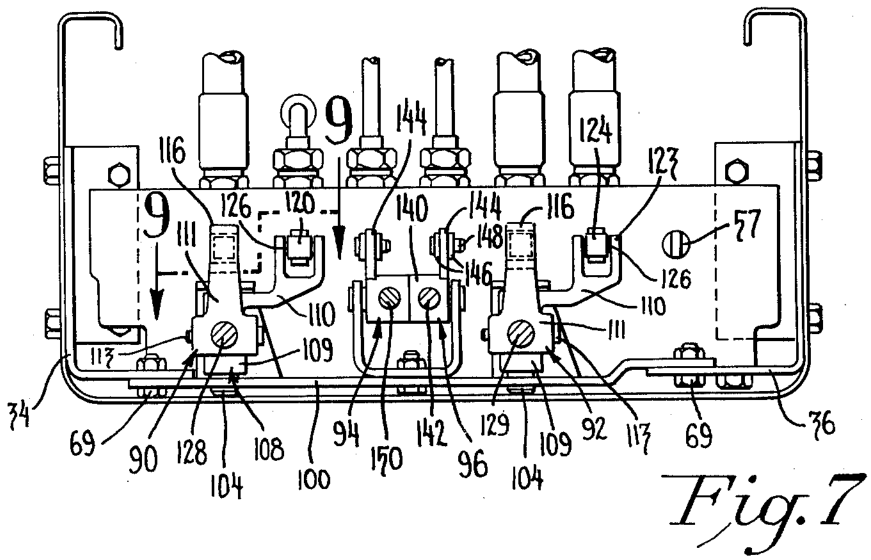
FIG. 7 is a sectional view taken on line 7—7 in FIG. 6.

Referring now to FIGS. 6 and 7 showing another form of lever assembly 89, the control console 10 is provided with a single lever control 90 to manipulate both of the valve plungers 51 and 52, a single lever control 92 to manipulate both of the valve plungers 55 and 56 and a pair of individual lever controls 94 and 96 to move the pair of valve plungers 53 and 54, respectively. The four lever controls 90, 92, 94 and 96 are mounted on a bracket member 100 which is fastened to the frame members 34 and 36 by means of the bolts 69.

Figure 8:
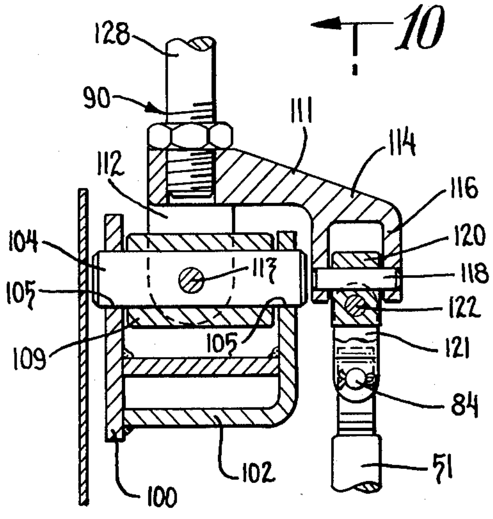
FIG. 8 is a sectional view at an enlarged scale taken on line 8—8 in FIG. 6.
Figure 9:
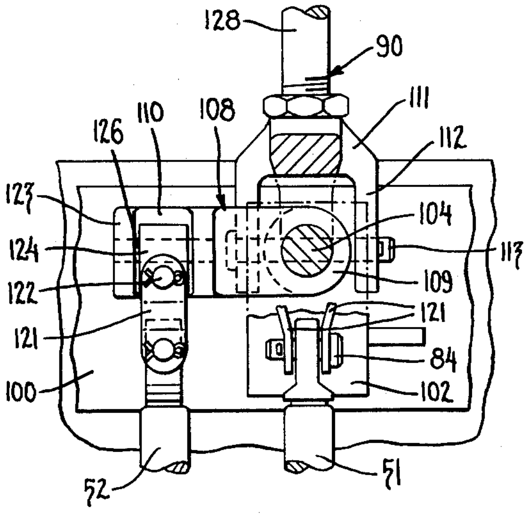
FIG. 9 is a sectional view taken on line 9—9 in FIG. 7.

The single lever controls 90 and 92 are generally similar and reference will be made to the single lever control 90 as seen in FIGS. 8 and 9. The support bracket 100 has a forwardly extending bracket element 102 and aligned openings 105 are formed in the bracket portions 100 and 102 to support a shaft 104 for pivotal movement about an axis tranversed to the base or bracket 100. Mounted on the shaft 104 is an arm assembly 108 which has a collar portion 109 and an extension 110 projecting to one side of the axis of the shaft 104 as seen in FIGS. 7 and 9.

Pivotally mounted on the arm assembly 108 is an actuating arm member 111. The actuating arm member 111 has a bifurcated portion 112 which receives the collar portion 109 of the arm assembly 108 and is pivoted thereto by a pin 113 passing through collar 109 and transversely through the shaft 104. The actuating arm assembly 111 includes a control arm portion 114 the free end of which terminates in a forked portion 116 supporting a pin 118. In the position shown in the drawings, the pin 118 is axially aligned with the axis of shaft 104. The pin 118 pivotally supports a mounting block 120 which pivotally holds a pair of links 121 on a pin 122 passing through the block 120 below and transversely to the pin 118. The lower ends of the links 121 pivotally receive the removable pin 84 at the upper end of the valve plunger.

Figure 10:
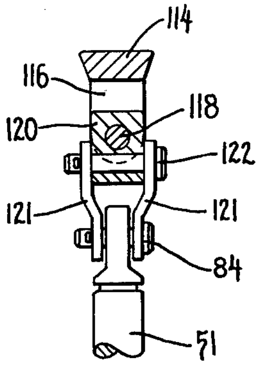
FIG. 10 is a sectional view taken on line 10—10 in FIG. 8.

The arm extension 110 is provided with a forked end 123 which as seen in FIG. 7, supports a block 124 for pivotal movement on a pin 126. The block 124 is similar to the block 120 seen in FIG. 10 and similarly supports a pivot pin 122 for another pair of links 121. In this instance the links 121 associated with arm 110 have been rotated approximately 90 degrees about the axis of the associated control plunger from the position of the links 121 associated with the control arm 111 so that the pins 84 connected to control plungers 51 and 52 are on axes transverse to each other.

The arm assembly 111 threadably receives the lower end of a control lever 128. Movement of the lever 128 about the axis of the pin 113 causes vertical movement of the control plunger 51 and transverse movement of the control lever 128 about the axis of pin 104 causes vertical movement of the valve control plunger 52. It will be noted that the control plungers 51 and 52 may be operated separately and individually or that they may be operated simultaneously by angular movement of the control lever 128 relative to its intersecting pivot axes defined by the pin 113 and the shaft 104.

The single lever control 92 at the right side of the mounting bracket 100 seen in FIGS. 6 and 7 includes a control lever 129 and is identical to the single lever control 90. The single lever control 92 is connected to operate the valve plungers 55 and 56. The valve plunger 57 is not provided with a control lever but it will be understood that the control lever 67 seen in FIG. 2 could be employed.

Figure 11:
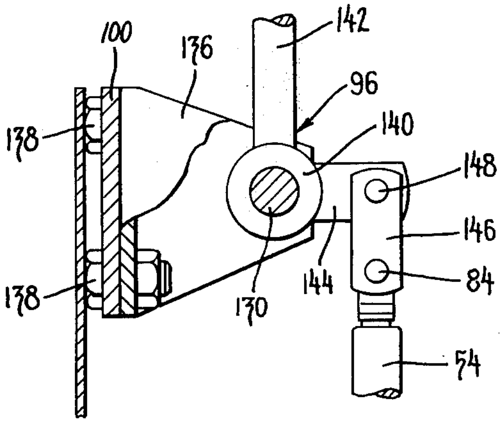
FIG. 11 is a sectional view at an enlarged scale taken on line 11—11 in FIG. 6.

The valve control plungers 53 and 54 are controlled by the pair of control lever assemblies 94 and 96 which are similar to the control lever 67 seen in FIG. 4. The control lever assemblies 94 and 96 are mounted to rotate on a common shaft 130 which as seen in FIG. 11, is supported by a U-shaped bracket 136 connected by means of bolts 138 to a central portion of the base bracket 100. The control 96 includes a collar 140 rotatable on shaft 130 and supporting a lever 142. An actuating arm 144 is connected to the collar 140 to support a pair of links 146 by a pin 148. The lower end of the links receive a pin 84 removably connected to the valve plunger 54. The control 94 is identical to control 96 except that its lever is identified by 150 and the links 146 are connected to plunger 53.

With the control lever arrangement of the console 10 seen in FIGS. 6 through 11, manipulation of the control lever 128 at the left side of console may be used to operate the valves 51 and 52 for control of various operations such as swinging and changing the elevation of a boom on a backhoe. Similarly, the control lever 129 at the right side of the console 10 may be used to manipulate the valve plungers 55 and 56 to control other functions such as the angle of the dip stick relative to the boom and the angle of the bucket relative to the dip stick, respectively. The levers 150 and 142 function in a manner similar to the levers 63 and 64 to control single functions such as positioning of the left and right stabilizers of a backhoe.

The substitution of a different lever assembly for the arrangement 89 shown in FIGS. 6 through 11 simply requires removing all of the pins 84 from the links 79, 121 and 146 and removal of the bolts 69. Thereafter, the entire control lever assembly may be removed and replaced with a different lever assembly such as the arrangement 60 shown in FIGS. 1 through 5.

It will be seen that a control console has been provided in which different lever arrangements such as individual lever controls for each of the valves or dual funtion control levers may be readily substituted for each other by simply disconnecting the pins connecting the control levers to the respective valves. In addition, the control pattern achieved by manipulating the various valves may be varied by interchanging the pair of lines 24 and 26 of one valve with the lines 24 and 26 of another of the valves. Such a change in operating pattern or in the type of lever controls which are used is accomplished without the necessity of replacing and substituting linkage or without the necessity of changing the positions of the valves involved.

The embodiment of the invention in which an exclusive property or privilege is claimed are defined as follows:

1. A valve control mechanism for a plurality of uniformly spaced valve control elements disposed in a common plane, comprising; a support structure adapted to be disposed in fixed relationship to said common plane, a pair of valve control assemblies, each of said valve control assemblies including mounting brackets which are relatively separable having a plurality of control arms pivotally mounted on one of said brackets and at least one arm on the other bracket with one of said control arms being associated with a respective control element, said control assemblies connected together to form a manifold assembly removably replaceable as a unit on said support structure, attaching means for connecting the mounting bracket of a selected one of said pair of valve control assemblies to said support structure, said attaching means being the sole means required to be removed to release said bracket containing said manifold assembly from said support structure, a connecting means on each of said control arms adapted for connection to each of said control elements, respectively, said connecting means each including a connecting element removable to separate said control arm from the associated control element, one of said valve control assemblies having a separate control lever movable from a neutral position for moving each of said control arms, and the other of said valve control assemblies having a single lever movable from a neutral position for moving at least one control arm associated with adjacent valve control elements.

2. The combination of claim 1 in which said valve control elements each operate a separate valve and in which said valves are interchangeable to position selected ones of said valve control elements in association with selected ones of said arms.

3. The combination of claim 2 in which said valves are connected together to form a manifold assembly removable and replaceable on said support structure as a unit independently of the selected one of said valve control assemblies mounted on said support structure.

4. The combination of claim 1 in which said arms of said pair of valve control assemblies are uniformly spaced to conform to the uniform spacing of said valve control elements.

5. The combination of claim 1 in which said control levers of said one valve control assembly are movable in a fore-and-aft direction to move all of said control elements and in which said single lever of said other valve control assembly is movable in a fore-and-aft direction to move one of said valve control elements and in a transverse direction to move said adjacent valve control element.

6. The combination of claim 1 in which one of said valve control assemblies has said control arms pivotally mounted on its bracket for movement about a common axis.

7. The combination of claim 6 in which said connecting elements are pivot pins, said pivot pins being aligned axially when said control elements are in their neutral position.

8. The combination of claim 1 in which the other of said valve control assemblies has a pair of its control arms positioned adjacent to each other and supported for pivotal movement relative to said bracket about intersecting axes.

9. The combination of claim 8 in which said connecting elements are pivot pins one of which is axially aligned with at least one other pin of another control arm and still another of said pins is disposed transversely to said one pin for all positions of said control arms.

* * * * *